United States Patent

Molly

[15] 3,647,322
[45] Mar. 7, 1972

[54] DEVICE FOR CONTROLLING QUANTITIES WHICH ARE DEFINED BY THE PRODUCT OF TWO MEASURED VARIABLES

[72] Inventor: Hans Molly, Dr.-Eugen-Essig-Strasse 48, 7502 Malsch, Germany

[22] Filed: Apr. 12, 1967

[21] Appl. No.: 630,388

[52] U.S. Cl. .................................................... 417/217
[51] Int. Cl. ................................................... F04b 49/00
[58] Field of Search .................... 103/162 A, 38 A, 38, 162; 91/199, 47; 60/53 A; 230/20; 242/75.53; 74/110; 417/213, 222

[56] References Cited

UNITED STATES PATENTS

| 1,256,624 | 4/1969 | Westbye | 74/110 |
| 2,667,788 | 2/1954 | May et al. | 74/110 |
| 2,179,071 | 11/1939 | Weidmann | 103/38 |
| 2,214,552 | 9/1940 | Ferris | 103/38 |
| 2,606,423 | 8/1952 | Spencer et al. | 103/38 X |
| 3,407,738 | 10/1968 | Bosch | 103/17 |
| 2,403,913 | 7/1946 | Ellis | 103/38 |
| 2,554,381 | 5/1951 | Patterson, Jr. | 103/1 X |
| 2,606,423 | 8/1952 | Spencer et al. | 60/53 |
| 2,931,176 | 4/1960 | Bloch et al. | 103/1 X |
| 2,932,948 | 4/1960 | Neff et al. | 103/1 X |
| 2,971,498 | 2/1961 | Bloch | 103/38 X |
| 3,163,115 | 12/1964 | Neff et al. | 103/38 |

*Primary Examiner*—William L. Freeh
*Attorney*—Darbo, Robertson & Vandenburgh

[57] ABSTRACT

A calculating linkage is used to adjust a device such as a hydraulic motor or a hydraulic pump wherein there are two variables involved. The calculating linkage has a pivotable lever means to which is connected a slidingly guided input member and a slidingly guided output member. The input member is connected to be responsive to one of the variables and the output member is connected to the device to adjust the other variable as an inverse function of the variation in the first variable.

29 Claims, 18 Drawing Figures

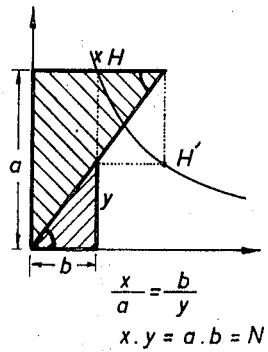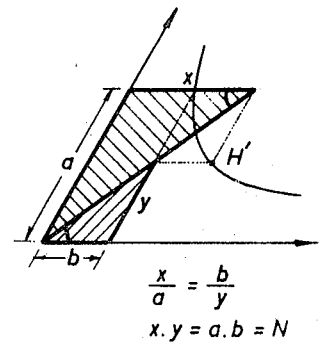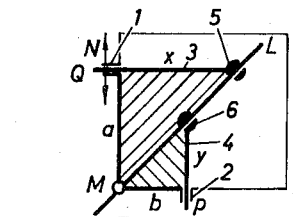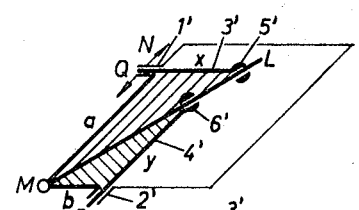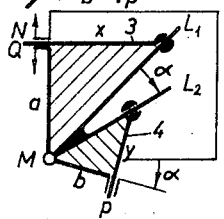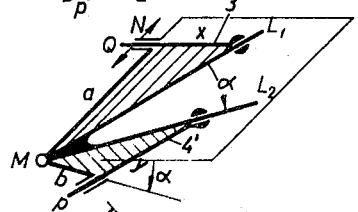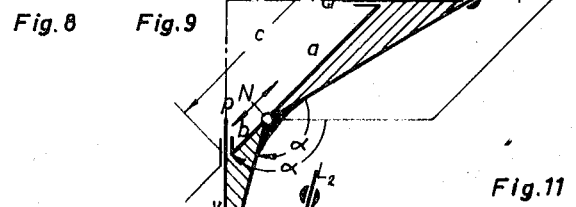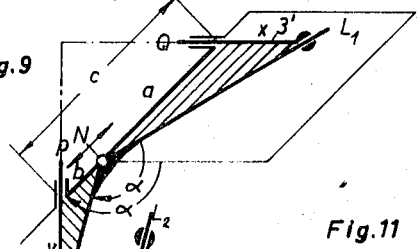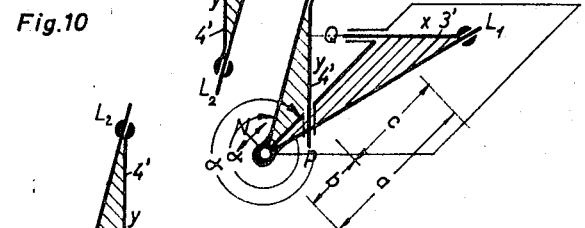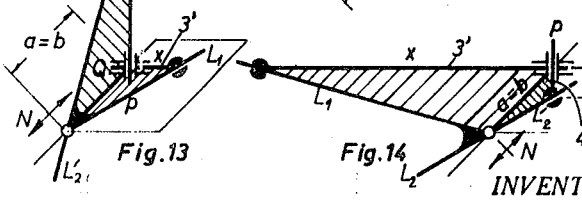

DEVICE FOR CONTROLLING QUANTITIES WHICH ARE DEFINED BY THE PRODUCT OF TWO MEASURED VARIABLES

This invention relates to a device for controlling quantities which are defined by the product of two measured variables.

Such a quantity is, for example, power, which is defined mechanically by the product of torque and angular velocity, or, in hydraulic machines, by the product of delivery volume and pressure. In order to maintain such a quantity defined by a product constant, it is necessary, with variations of one measured variable to change the other variable inversely thereto. If, for example, in a hydraulic machine the pressure varies, the delivery volume must be changes inversely with pressure, in order to maintain the power constant, so that the product of pressure and volume remains constant.

It is the object of this invention to provide a setting and control device for quantities, which are defined by the product of two measured variables.

The invention is characterized in that a calculating linkage is provided for changing one of the measured variables inversely to the other one. The linkage is in the form of a lever assembly comprising a slidingly guided input member, a slidingly guided output member and a pivoted intermediate member. The output and intermediate members are connected pivotable and sliding to the input member with their pivot points along a common straight guide or one straight guide each extending through the pivot point of said intermediary member, and the input member is slidable along its associated straight guide and the second variable is changed in proportion to the path of adjustment of the output member.

It can be shown that with such a calculating linkage, a relation between the two measured variables necessary for the control of the product quantity can be achieved.

It is advantageous, if the output member varies the setpoint of a control device for the second measured variable operating with auxiliary force. By this means, the calculating linkage is not loaded with the forces for a direct control of the second measured variable, by which, depending on the type of setting of the input member, the relation of the measured variables could be adulterated.

In order to make the amount of the controlled product quantity variable, the pivot point of the intermediate member may be made adjustable relative to the straight guides.

Some embodiments of the invention are schematically shown in the accompanying drawings, and are described hereinbelow:

FIGS. 1 through 3 illustrate the geometric fundamentals of the calculating linkage used in the invention;

FIGS. 4 through 14 show schematically different embodiments of calculating linkages;

THE GEOMETRIC FUNDAMENTALS

Figure 15:
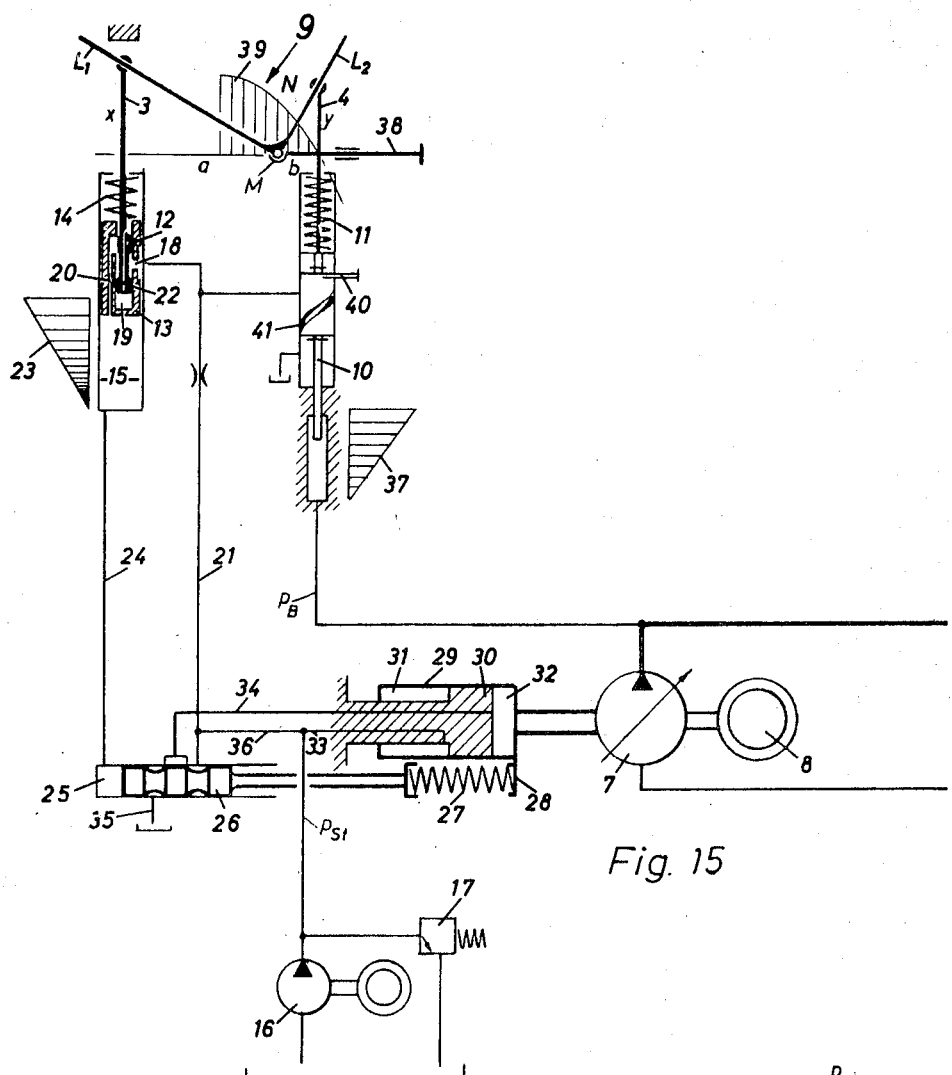
FIG. 15 shows the application of the invention in the power control of a hydraulic piston pump having adjustable piston stroke and driven by an electric motor at constant rate.

In FIG. 1, a family of hyperbolas is illustrated. An optional point H has the coordinates $a$ and $b$. Another point H' has the coordinates $x$ and $y$. The following equation is valid for each hyperbola:

$$a \cdot b = x \cdot y = \text{const.},$$

that is to say the $y$ value is inversely proportional to $x$. In FIG. 2, the same hyperbola containing the points H and H' is shown. There, the horizontal line through H is produced to the intersection with the dotted vertical line through H'. A connection line is drawn from this intersection to the coordinate origin. Furthermore a dotted horizontal line is drawn from H' to said connection line. It will be noted that the connection line through the coordinate origin intercepts the value $x$, on the parallel in the distance $a$ from the X-axis, and the associated value $y$ on the parallel in the distance $b$ from the Y-axis. Also from the similitude of the two triangles shown the following equation can be gathered:

$$a/x = y/b.$$

The same relation is obtained with oblique angled coordinates, as shown in FIG. 3. This relation is, of course, valid for any value of $x$, that is to say for any position of the oblique connection line passing through the coordinate origin. For each position of this line, a pair of values $x$, $y$ is obtained from the intercepts on the parallels to the X-axis in the distance $a$ and to the Y-axis in the distance $b$, respectively, which pair satisfies the above condition. Of course, $a$ and $b$ are two arbitrary fixed values.

These geometric relations can be imitated by appropriate lever assemblies, and a calculating linkage may be provided thereby, which transforms an input value $x$ into an inverse output value $y$. Such linkages are shown in FIGS. 4 and 5, FIG. 4 corresponding to the geometry of FIG. 2 with rectangular coordinates, and FIG. 5 corresponding to the geometry of FIG. 3 with oblique coordinates.

DESIGNS OF CALCULATING LINKAGES

Referring to FIG. 4, two straight guides 1 and 2 are arranged perpendicular to each other and parallel to the X and Y axes, respectively, at a distance $a$ and $b$ therefrom, respectively, in which guides rods 3 and 4 are guided. These rods are connected to link or lever member L at 5 and 6, respectively pivotable and slidable along the link member L. It will be noted that the length of the rod 3 between the Y-axis and the pivot point 5 equals $x$, and the length of the rod 4 between the X-axis and the pivot point 6 equals $y$. In similar manner, this is valid for FIG. 5, wherein the corresponding parts are designated by the same but primed reference numeral as in FIG. 4. In both cases, the relations given above between $x$ and $y$ are found.

Nothing is changed in the geometric relations, if, as shown in FIGS. 6 and 7, the guide 2 is rotated relative to FIG. 4 through an angle $\alpha$ with the same distance $b$ from the coordinate origin, and, accordingly, instead of one guide link member L two integral guide links or levers L1 and L2 are provided and form an angle $\alpha$, the rod 3 being pivoted and guided on link member L1 and rod 4 being pivoted and guided on link member L2. Thus also in these cases $a \cdot b = x \cdot y$. In these cases, in broad terms, there is one pivoted intermediate member, having two straight guides (in the form of link members L1, L2) extending through the pivot point, input member 3 and output member 4 being pivoted thereon and slidable with their pivot points along one of these straight guides each. By appropriate selection of the angle $\alpha$, different positions of the guides for input and output members, as required by the particular design, may be achieved.

If $\alpha$ is made equal to the 180° complement angle to the coordinate system angle, as shown in the embodiments of FIGS. 8 and 9, the guides 1,2 for the input and output members 3 and 4, respectively, can be arranged on a common line. In the embodiment of FIG. 9 derived from a 45° coordinate system, mutually perpendicular guides for the input and output members are achieved with an angle of 135° between the link members. If the angle $\alpha$ is selected 270°, as shown in FIG. 10, the input and output members are moved also parallel to each other but, in contrast to the embodiment of FIG. 8, in the same direction. A similar arrangement with an angle of more than 270° and two mutually perpendicularly guided input and output members is shown in FIG. 11. FIG. 12 is a specific form of the arrangement of FIG. 10, wherein the two input and output members are aligned with each other, thus where $a=b$. FIGS. 13 and 14 are other embodiments, derived from a 45° coordinate system and comprising mutually perpendicular input and output members. FIG. 13 is an arrangement of the same type as FIG. 11, also for the specific case of $a=b$.

By moving the straight guides 1, 2 relative to the pivot point of the intermediary member or by shifting the pivot point, as indicated by the double arrows in FIG. 4 through 14, the constant $a \cdot b = N$ may be varied.

PUMP CONTROL

FIG. 15 shows an arrangement, wherein the power of a hydraulic piston pump 7 is to be controlled, which pump is driven at a constant rate by an electric motor 8 or the like. The pump is of the type having a variable piston stroke. The power $N$ of the pump results from the product of pressure $p$ and delivery (volume) Q. In the pQ-diagram of FIG. 16, the loci of equal power are hyperbolas. In the arrangement of FIG. 15, the power $N$ defined by the product of pressure $p$ and delivery Q is maintained on a given value by means of a calculating linkage 9 as shown in FIG. 8. If the pressure $p$ varies, the delivery Q of the pump 7 is changed inversely proportionate thereto through the calculating linkage 9. The operating pressure $P_B$ of the pump acts on a measuring piston 10 which is loaded by a spring 11. This measuring piston is connected with the rod 4 forming the input member of the calculating linkage 9, the movement $y$ of which is proportional to the pump pressure $P_B$. This results in a rotation of the intermediate member of the calculating linkage comprising link members L1 and L2, and link member L1 moves the rod 3 forming the output member here by an amount $x$ downwards, this latter amount being inversely proportional to $y$.

A pilot piston 12 is mounted on rod 3. The pilot piston 12 slides in a longitudinal bore 19 of a piston 13 closed at the bottom. Piston 13 slides in a cylinder 15 and is loaded by a spring 14, urging the piston 13 downwards in FIG. 15. A control pressure conduit 21 connected to a control pressure pump 16 opens laterally into the cylinder 15, the pressure (control pressure $P_{St}$) of the pump being controlled by a bleed valve 17. The piston 13 is provided with a lateral aperture 18, through which oil from the control pressure conduit passes into the longitudinal bore 19 of the piston 13.

The pilot piston 12 slides at its top and bottom tightly in the longitudinal bore 19 and is of reduced diameter in its central portion. The upper portion of the pilot piston 12 forms control edges by which a passage 20 extending alongside the longitudinal bore 19 and opening in the upper portion thereof is connected either with the upper portion of the cylinder open to atmosphere or, through aperture 18 with the control pressure conduit 21. A passage 22 extends through the whole pilot piston 12, which passage provides a pressure balance between top and bottom of the pilot piston. When the pilot piston 12 is moved upwards by the rod 3, its lower control edge opens the communication from the control pressure conduit 21 to the passage 20. Oil flows into the lower chamber of cylinder 15, until the oil pressure therein overcomes the force of the spring and lifts the piston 13 so that the control edge of the pilot piston 12 again closes the passage 20. As the spring force increases proportional to the travel of the piston 13, and, on the other hand, the piston 13 follows the travel $x$ of the pilot piston 12, a pressure increasing or decreasing with $x$ occurs in the cylinder 15 below the piston 13, as shown by the diagram 23.

This pressure in cylinder 15 is transmitted to a slide valve casing 25 through conduit 24. A slide valve 26 sliding in casing 25. The pressure from cylinder 15 acts on front face of the slide valve 26. From the other side, the slide valve 26 is acted upon by a spring 27. The spring 27 abuts a spring abutment 28, which is provided on a cylinder 29. The cylinder 29 is coupled with the stroke adjusting mechanism of the pump 7. A fixed differential piston 30 is arranged in the cylinder 29 and subdivides the cylinder 29 into two chambers 31 and 32. The chamber 31 having the smaller surface is supplied with control pressure $P_{st}$ from pump 16 through a conduit 33. The chamber 32 having the larger piston surface is connected through a conduit 34 and the slide valve 26 either with a vent 35 or through conduit 36 with the control pressure pump 16.

Figure 16:
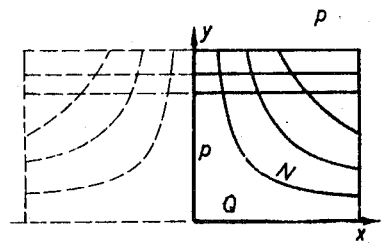
FIG. 16 is an associated diagram.

If the pressure from the cylinder 15 overcomes the spring 27, the chamber 32 is connected with the vent 35 through conduit 34. Thereby, the cylinder 29 is moved to the left, whereby the spring 27 is correspondingly stronger tensioned, the slide valve 26 is moved to the left and shuts the passage 34 again. Thus the travel of the cylinder 29 and thereby the stroke of the piston pump 7 and the delivery Q thereof is proportional to $x$. On the other hand due to the calculating linkage 9, $x$ is inversely proportional to $y$ and this according to diagram 37, is proportional to the operating pressure $p_B$. Thus upon variation of the operating pressure $p_B$, the delivery Q is changed so that the product $$p_B \cdot Q = \text{const.} \quad x \cdot y = \text{const.} \quad a \cdot b$$

is maintained constant. By an adjusting member 38, the pivot point M of the intermediary member with the link members L1, L2 can be shifted, whereby $a \cdot b$ and thus the controlled power $N$ is changed. In the diagram of FIG. 16, this would mean the transition to another hyperbola. The diagram 39 in FIG. 15 shows the controlled power as a function of the position of the pivot point M.

When the pressure increases beyond pressure values set by the lever 40 by means of cam 41, the control pressure $p_{st}$ from pump 16 is vented downstream of a throttle in conduit 21, to such an extent that the controlled pump 7 remains with reduced stroke volume and the pressure set at 40. The piston 13 leaves the control position of the pilot piston 12 (operating with negative overlap) and follows the tension of spring 14. The control edges are provided with corresponding excess strokes.

MOTOR CONTROL

Figure 17:
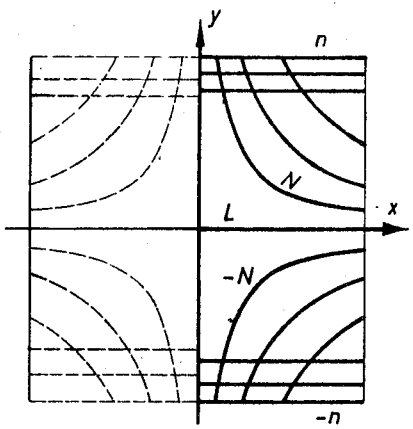
FIG. 17 shows a diagram similar to that of FIG. 16 for the power control of a hydraulic piston motor operating at constant pressure and taking up variable torques.

FIG. 17 shows the use of the invention for controlling the power of a hydraulic piston motor, which is fed with constant pressure from a pressure supply line and has to exert varying torques. Depending on the torque to be exerted or the load L, the rate of revolutions $\eta$ is changed by changing the piston stroke. This is done in such a manner that the product of load L or torque and rate of revolutions $\eta$ remains constant. Torque times rate of revolutions, however, is power $N$. This change of the rate of revolutions $\eta$ inversely proportional to the load L is again effected by means of a calculating linkage of the type shown in FIG. 8, which is generally designated by 42 in FIG. 18.

Figure 18:
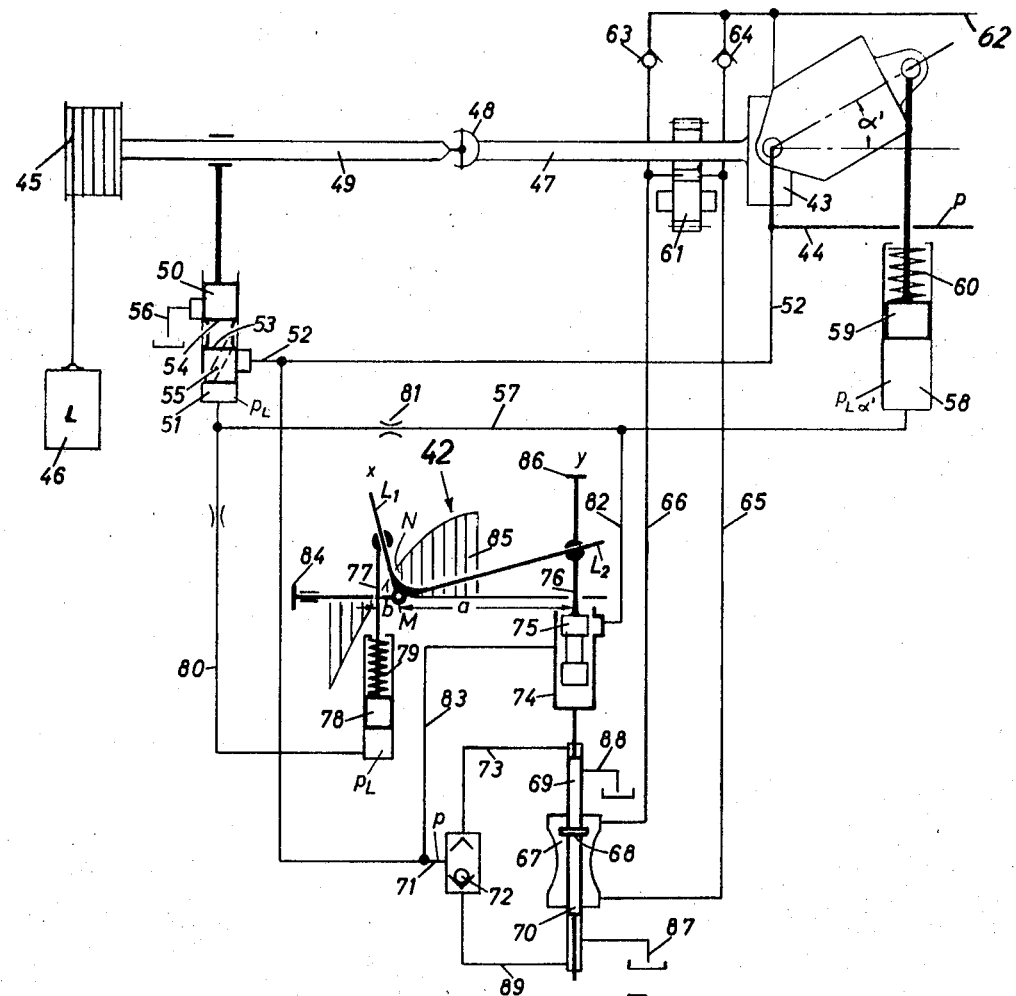
FIG. 18 is a schematic illustration of a control system for such a power control.

In the embodiment of FIG. 18, the motor 43, which is fed by a pressure supply line 44 with constant pressure P, drives a drum 45, by means of which a load 46 hanging on a rope is to be lifted or lowered. The motor 43 is a hydraulic axial piston type motor, the piston stroke of which can be changed by variation of the angle $\alpha'$. The motor 43 drives the drum 45 through a shaft 47, which has a universal joint 48 permitting a swinging movement of the shaft portion 49 on the side of the drum. This shaft portion is, for the purpose of load measurement, supported on a slide valve 50 sliding in a cylinder 51. The cylinder 51 has a lateral control port which is connected with the pressure supply line through a conduit 52. The slide valve has a recessed central portion and forms, on both sides thereof, control edges 53 and 54. The cylinder chamber below the slide valve 50 is connected with the annular chamber between the control edges 53 and 54 through a passage 55 provided in the slide valve. The cylinder 51 is provided, in its upper portion, with a further lateral control port, which is connected with a vent 56. In the state of balance the two control ports are closed by the slide valve 50. When the load L overcomes the pressure in the cylinder 51, the slide valve 50 will move downwardly. Thereby fluid from the pressure supply line flows through conduit 52, the control port freed by the control edge 53, the annular chamber between the control edges 53, 54 and the passage 55 into the cylinder 51 and increases the pressure there until the slide valve is moved upwards again and the control port is closed. If the pressure in the cylinder 51 overcomes the load L, the slide valve 50 is lifted and frees a communication to the vent 56 through a passage 55. Thus a pressure $P_L$ will adjust itself within the cylinder, which pressure is directly proportional to the load L.

At first the static case is to be considered, where the load is only to be held stationary. In the most simple case, the pressure $p_L$ is applied to a cylinder 58 through a conduit 57. The cylinder 58 contains a piston 59 which is loaded by a spring 60 and coupled to the stroke adjusting mechanism of motor 43. Therefore, at a power of zero, i.e., with rate of revolution of zero, such an adjustment of the angle $\alpha'$ is effected, that the torque exerted on the motor 43 by the pressure in the supply line 44 just balances the load torque. The load is held stationary.

A pump 61 is mounted on shaft 47, which pump, depending on the direction of rotation, sucks oil from the low-pressure or return line 62 through check valves 63 or 64 and directs an oil flow proportional to the rate of revolutions through the conduits 65, 66 and through a restrictor 67. The restrictor contains a throttling body 68 mounted on a piston which extends centrally through the restrictor and has the end portions 69, 70. A pressure $p$ from the pressure supply line, thus a constant force, acts on the piston portion 69 through conduit 71, a valve 72 and a conduit 73. A force due to the oil flow becomes effective on the throttling body 68, which force depends on the delivery of the pump 61, and thus on the rate of revolutions of motor 43, and of the position of the throttling body in the restrictor 67. The restrictor 67 is so dimensioned, and shaped that the adjustment of the throttling body 68 resulting from the balance between the dynamic force on the throttling body 68 and the constant static force on the piston portion 69 is proportional to the rate of revolutions of the motor 43 and the "tachometer" pump 61.

A slide valve casing 74 is connected with the piston portion 69 and the throttling body 68. A slide valve 75 slides in the slide valve casing 74. The slide valve 75 is connected with the output member 76 of the calculating linkage 42. The input member 77 of the calculating linkage is connected with a piston 78, which is loaded by a spring 79 and under which the pressure $p_L$ from cylinder 51 is directed through a conduit 80.

The slide valve 75 and the slide valve casing 74 connect the conduit 57 between cylinder 51 and cylinder 58 downstream of a throttle 81 through the conduit 82 either with atmosphere or with a pressure conduit 83, which branches off from the conduit 71 and in which the pressure $p$ from the pressure supply line prevails. Thereby, the pressure $p_{La}$ in the cylinder 58 is somewhat modified relative to the pressure $p_L$ in the cylinder 51, and this results in a corresponding change of the angle $\alpha'$ and thereby of the rate of revolutions $\eta$ of the motor.

The travel of the slide valve 75 is determined by the output member 76 of the calculating linkage 47 and thus corresponds to $y$. The adjustment of the angle $\alpha'$ through the cylinder 58 and the piston 59 action on the spring 60 causes a change of the rate of revolutions, namely in such a manner that the slide valve casing 74 with the throttling body 68 follows the movement of the slide valve 75. Thus the rate of revolutions $\eta$ of the motor 43 is changed proportional to the movement $y$ of the output member of the calculating linkage.

The input member 77, as hereinbefore described, through the piston 78, which is loaded by a spring 79 is adjusted by the amount $x$ proportional to $p_L$ and thus, as described, to the torque to be exerted. The calculating linkage 42 takes care that upon variation of the load and thus of the torque to be exerted the rate of revolutions is changed inversely proportional thereto through slide valve 75. If T designates the torque to be exerted, which is here defined by load L times drum radius, the power will be $$N = T \cdot \eta = \text{const.} \quad x \cdot y = \text{const.} \quad a \cdot b$$

Also here, the power $N$ can again be varied by adjusting the pivot point M by means of the adjusting member 84. The diagram 85 shows the adjusted power $N$ as a function of the position of the pivot point.

With given power, heavy loads are lifted slowly, lightweight loads correspondingly faster. The amount of the power can be set manually at handle 84. A handle 86 on the output member 76 permits the reading of the respective rate of revolutions just present. However, also the handle 86 can be set manually to set a certain rate of revolutions. The controller then adjusts the machine to the load conditions associated with this rate, independent of the torques to be taken up. The handle 84 then indicates the respective required power.

Of course, the calculating linkage can be set to "negative" powers $N$, if the pivot point M is shifted to left beyond the input member 77, (see diagram 85). Thereby the slide valve 75 is moved downwards, corresponding to negative $y$. The slide valve casing 74 must follow it, which is effected by reversing the direction of rotation of the motor 43. The pump 61 delivers in reverse direction and the throttling body 68 travels through the narrowest spot of the restrictor 67, a dynamic pressure difference exerting a downwards force on the throttling body. The lower piston portion 70 has closed the connection 87 and the upper piston portion has freed the vent 88. Consequently the valve 72 changes over and directs the pressure $p$ from the pressure supply line 44 through a conduit 89 under the piston 70, so that this constant force counteracts the dynamic pressure on the throttling body. Thus also with negative $y$ a proportionality between the rate of revolution $\eta$ and travel $y$ of the output member 76 of the calculating linkage 42 is achieved. This mode of operation corresponds the right-hand lower quadrant in FIG. 17. In practice, this means a lowering of the load 46 with simultaneous energy supply to the pressure supply line.

What I claim is:

1. In an apparatus for controlling a device which is responsive to two variables to adjust the operation of the device so that the product of the two variables is a constant and having first actuating means responsive to one of the variables and second actuating means connected to the device to adjust the operation of the device, the improvement comprising:

lever means mounted for pivotal movement about a point;

a first rod having two ends, one of said ends slideably engaging said lever means for movement of the rod end along the lever means;

first guide means slideably engaging said first rod and holding said rod at a fixed angular position with respect to the pivot point of said lever means while permitting longitudinal movement of the rod in the guide means;

a second rod having two ends, with one of its ends slideably engaging said lever means for movement of said one end of the second rod means along the lever means; and second guide means slideably engaging said second rod and holding said second rod at a fixed angular position with respect to the pivot point of said lever means while permitting longitudinal movement of the second rod in the second guide means;

said guide means being so positioned with respect to said lever means that with a given longitudinal movement of the first rod, the second rod will move longitudinally an amount that is inversely proportionate to the movement of the first rod;

said first actuating means being connected to said first rod to move said rod and lever means in response to changes in said one variable;

said second actuating means being connected to said second rod to adjust said device in response to the movement of said second rod.

2. In an apparatus as set forth in claim 1, wherein said second actuating means adjusts said device with auxiliary force and applies no significant loading to said second rod.

3. In an apparatus as set forth in claim 2, including means for adjusting the space between the point and at least one guide means as measured along a line between the point and the guide means, said line being angularly disposed with respect to said lever means, to thereby change the proportion of movement of the second rod with respect to the first.

4. In an apparatus as set forth in claim 3, wherein said lever means comprising a first and a second lever separated by a predetermined angle and fixedly connected to each other, said first rod slideably engaging said first lever, and said second rod slideably engaging said second lever.

5. In an apparatus as set forth in claim 4, wherein said device is to be controlled in accordance with a coordinate system having a coordinate system angle, said predetermined angle being the 180° complement of the coordinate system angle.

6. In an apparatus as set forth in claim 5, wherein said device comprises a hydraulic piston pump with adjusting means to control the length of the piston stroke, said pump having an output, said first actuating means being pressure responsive and being connected to the output of the pump to position the first rod in response to the pressure output of the pump, said second actuating means being connected to said adjusting means.

7. In an apparatus as set forth in claim 6, wherein said second actuating means adjusts said device without imposing any significant load on said second rod and includes:
a main cylinder having a closed end, a fluid pressure port at a side of said cylinder and a fluid output port at said closed end;
a main piston in said cylinder and having a cylinder cavity therein and fluid channel means communicating with said cavity, with the main cylinder at the side of the piston corresponding to said side of the main cylinder and with the main cylinder at the closed end thereof;
spring means resiliently urging said main piston toward the closed end of the main cylinder; and
a pilot piston in said cylinder cavity and connected to said second rod.

8. In an apparatus as set forth in claim 7 for use with a fluid pressure source and wherein said second actuating means includes:
a movably mounted second cylinder;
a piston in said second cylinder and having a fixedly mounted piston rod extending through one end of said second cylinder, said piston thereby dividing said second cylinder into a first chamber wherein said piston has a comparatively large pressure face and a second chamber wherein said piston has a comparatively small pressure face;
means connecting said second cylinder to said adjusting means; and
control slide valve means connected to said output port to be urged in one direction by fluid pressure from said main cylinder and resiliently connected to said second cylinder to be urged in the other direction in accordance with the position of said second cylinder.

9. In an apparatus as set forth in claim 1, wherein said device comprises a hydraulic piston pump with adjusting means to control the length of the piston stroke, said pump having an output, said first actuating means being pressure responsive and being connected to the output of the pump to position the first rod in response to the pressure output of the pump, said second actuating means being connected to said adjusting means.

10. In an apparatus as set forth in claim 9, wherein said second actuating means adjusts said device without imposing any significant load on said second rod and includes:
a main cylinder having a closed end, a fluid pressure port at a side of said cylinder and a fluid output port at said closed end;
a main piston in said cylinder and having a cylinder cavity therein and fluid channel means communicating with said cavity, with the main cylinder at the side of the piston corresponding to said side of the main cylinder and with the main cylinder at the closed end thereof;
spring means resiliently urging said main piston toward the closed end of the main cylinder; and
a pilot piston in said cylinder cavity and connected to said second rod.

11. In an apparatus as set forth in claim 10 for use with a fluid pressure source and wherein said second actuating means includes:
a movably mounted second cylinder;
a piston in said second cylinder and having a fixedly mounted piston rod extending through one end of said second cylinder, said piston thereby dividing said second cylinder into a first chamber wherein said piston has a comparatively large pressure face and a second chamber wherein said piston has a comparatively small pressure face;
means connecting said second cylinder to said adjusting means; and
control slide valve means connected to said output port to be urged in one direction by fluid pressure from said main cylinder and resiliently connected to said second cylinder to be urged in the other direction in accordance with the position of said second cylinder.

12. In an apparatus as set forth in claim 1, wherein said second actuating means adjusts said device without imposing any significant load on said second rod and includes:
a main cylinder having a closed end, a fluid pressure port at a side of said cylinder and a fluid output port at said closed end;
a main piston in said cylinder and having a cylinder cavity therein and fluid channel means communicating with said cavity, with the main cylinder at the side of the piston corresponding to said side of the main cylinder and with the main cylinder at the closed end thereof;
spring means resiliently urging said main piston toward the closed end of the main cylinder; and
a pilot piston in said cylinder cavity and connected to said second rod.

13. In an apparatus as set forth in claim 12 for use with a fluid pressure source and wherein said second actuating means includes:
a movably mounted second cylinder;
a piston in said second cylinder and having a fixedly mounted piston rod extending through one end of said second cylinder, said piston thereby dividing said second cylinder into a first chamber wherein said piston has a comparatively large pressure face and a second chamber wherein said piston has a comparatively small pressure face;
means connecting said second cylinder to said adjusting means; and
control slide valve means connected to said output port to be urged in one direction by fluid pressure from said main cylinder and resiliently connected to said second cylinder to be urged in the other direction in accordance with the position of said second cylinder.

14. In an apparatus as set forth in claim 1, wherein said lever means comprising a first and a second lever separated by a predetermined angle and fixedly connected to each other, said first rod slideably engaging said first lever, and said second rod slideably engaging said second lever.

15. In an apparatus as set forth in claim 14, wherein said device is to be controlled in accordance with a coordinate system having a coordinate system angle, said predetermined angle being the 180° complement of the coordinate system angle.

16. In an apparatus as set forth in claim 1, including means for adjusting the space between the point and at least one guide means as measured along a line between the point and the guide means, said line being angularly disposed with respect to said lever means, to thereby change the proportion of movement of the second rod with respect to the first.

17. In an apparatus as set forth in claim 1 for use with a supply of hydraulic fluid under constant pressure and wherein said device is a hydraulic piston motor connected to said supply, said motor having an output shaft and control means to adjust the speed of rotation of said shaft, said apparatus including:
means connecting said shaft to said first actuating means to adjust the first actuating means as a function of the torque exerted by said shaft; and means connecting said second actuating means to said control means to adjust the speed of the output shaft of the motor.

18. In an apparatus as set forth in claim 17, wherein
said second actuating means includes a fluid operated piston in a control cylinder and a spring urging said piston in one direction in the cylinder; and
said means connecting said shaft to said first actuating means comprising a setting pressure chamber with a vent connection, a pressure connection and a control connection and a control piston in said chamber, said control connection communicating with said control cylinder.

19. In an apparatus as set forth in claim 18, wherein
said means connecting said shaft to said first actuating means includes a throttle connected to said control connection; and
said first actuating means includes an actuating cylinder, an actuating piston in said actuating cylinder and a spring urging said actuating piston in one direction in said actuating cylinder, said actuating cylinder being connected to said throttle so that fluid under pressure from said control connection urges said actuating piston in the other direction in said actuating cylinder, said actuating piston being connected to said first rod.

20. In an apparatus as set forth in claim 19, including
pump means connected to said shaft to produce a fluid flow proportional to the speed of rotation of said shaft;
restrictor means having movable throttling means urged in one direction, said restrictor means being connected to said pump so that the movable throttling means is urged in the other direction to an extent that is a function of the output of the pump; and wherein
said second actuating means includes a slide valve having a movable casing and a movable valve member, said casing being connected to said movable throttling means to be moved thereby, said movable valve member being connected to said second rod to be moved thereby, said casing communicating with said constant pressure supply line, with a vent and with said control cylinder to adjust the pressure in said control cylinder as a function of the position of the movable valve member.

21. In an apparatus as set forth in claim 20, including means for adjusting the space between the point and at least one guide means as measured along a line between the point and the guide means, said line being angularly disposed with respect to said lever means, to thereby change the proportion of movement of the second rod with respect to the first.

22. In an apparatus as set forth in claim 21, wherein said lever means comprising a first and a second lever separated by a predetermined angle and fixedly connected to each other, said first rod slideably engaging said first lever, and said second rod slideably engaging said second lever.

23. In an apparatus as set forth in claim 22, wherein said device is to be controlled in accordance with a coordinate system having a coordinate system angle, said predetermined angle being the 180° complement of the coordinate system angle.

24. In an apparatus as set forth in claim 20, wherein said lever means comprising a first and a second lever separated by a predetermined angle and fixedly connected to each other, said first rod slideably engaging said first lever, and said second rod slideably engaging said second lever.

25. In an apparatus as set forth in claim 20, wherein said device is to be controlled in accordance with a coordinate system having a coordinate system angle, said predetermined angle being the 180° complement of the coordinate system angle.

26. In an apparatus as set forth in claim 4, wherein said predetermined angle is 90°.

27. In an apparatus as set forth in claim 4, wherein said predetermined angle is 135°.

28. In an apparatus as set forth in claim 4, wherein said predetermined angle is 270°.

29. In an apparatus as set forth in claim 4, wherein said predetermined angle is 315°.

* * * * *